US009129292B2

(12) United States Patent
Almeida et al.

(10) Patent No.: US 9,129,292 B2
(45) Date of Patent: Sep. 8, 2015

(54) SYSTEM AND METHOD FOR EXAMPLE BASED TARGETED MARKETING

(75) Inventors: Noel J. Almeida, Bangalore (IN); Jayanta Basak, New Delhi (IN); Raghuram Krishnapuram, New Delhi (IN); Debapriyo Majumdar, Kolkata (IN); Deepak S. Padmanabhan, Kerala (IN); Karthik Visweswariah, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1488 days.

(21) Appl. No.: 12/608,162

(22) Filed: Oct. 29, 2009

(65) Prior Publication Data

US 2011/0106580 A1 May 5, 2011

(51) Int. Cl.
G06Q 30/00 (2012.01)
G06Q 30/02 (2012.01)

(52) U.S. Cl.
CPC ............ *G06Q 30/02* (2013.01); *G06Q 30/0201* (2013.01); *G06Q 30/0204* (2013.01)

(58) Field of Classification Search
None
See application file for complete search history.

(56) References Cited

U.S. PATENT DOCUMENTS

| | | | | |
|---|---|---|---|---|
| 6,055,510 | A * | 4/2000 | Henrick et al. | 705/14.53 |
| 6,236,975 | B1 * | 5/2001 | Boe et al. | 705/7.32 |
| 6,640,215 | B1 * | 10/2003 | Galperin et al. | 706/19 |
| 6,917,816 | B2 * | 7/2005 | Abed et al. | 455/556.1 |
| 7,630,986 | B1 * | 12/2009 | Herz et al. | 1/1 |
| 7,680,495 | B2 * | 3/2010 | Abed et al. | 455/426.2 |
| 7,707,059 | B2 * | 4/2010 | Reed et al. | 705/7.31 |
| 7,921,042 | B2 * | 4/2011 | Jacobi et al. | 705/26.7 |
| 8,296,182 | B2 * | 10/2012 | Chari et al. | 705/14.43 |
| 8,311,863 | B1 * | 11/2012 | Kemp | 705/7.11 |
| 8,341,019 | B2 * | 12/2012 | McCullough | 705/14.49 |
| 2002/0069119 | A1 * | 6/2002 | Rogatinsky | 705/26 |
| 2002/0198786 | A1 | 12/2002 | Tripp et al. | |
| 2003/0050048 | A1 * | 3/2003 | Abed et al. | 455/414 |
| 2003/0208399 | A1 | 11/2003 | Basak et al. | |
| 2003/0212619 | A1 | 11/2003 | Jain et al. | |
| 2004/0143485 | A1 * | 7/2004 | Naples et al. | 705/10 |
| 2005/0131770 | A1 | 6/2005 | Agrawal | |
| 2005/0202811 | A1 * | 9/2005 | Abed et al. | 455/426.2 |
| 2007/0112614 | A1 | 5/2007 | Maga et al. | |
| 2008/0033821 | A1 * | 2/2008 | Jacobi et al. | 705/14 |
| 2008/0065476 | A1 | 3/2008 | Klein et al. | |
| 2008/0082399 | A1 | 4/2008 | Noble et al. | |
| 2009/0018996 | A1 | 1/2009 | Hunt | |
| 2009/0132365 | A1 * | 5/2009 | Gruenhagen et al. | 705/14 |
| 2009/0132437 | A1 * | 5/2009 | Naples et al. | 705/402 |
| 2009/0254971 | A1 * | 10/2009 | Herz et al. | 726/1 |

(Continued)

OTHER PUBLICATIONS

Domingos, Pedro, and Matt Richardson. "Mining the network value of customers." Proceedings of the seventh ACM SIGKDD international conference on Knowledge discovery and data mining, ACM, 2001.*

(Continued)

*Primary Examiner* — Gurkanwaljit Singh
(74) *Attorney, Agent, or Firm* — Ference & Associates LLC (57) ABSTRACT

Embodiments of the invention provide retailers with the ability to employ concept-based marketing using only a few representative examples. Embodiments of the invention take seed examples, utilize the seed examples to provide an expanded list (that can be edited as desired) representative of the concept, and map the expanded list to a final set of customers to be included in a targeted marketing operation.

19 Claims, 4 Drawing Sheets

(56) References Cited

U.S. PATENT DOCUMENTS

2011/0022475 A1* 1/2011 Inbar et al. .................. 705/14.66
2011/0179081 A1* 7/2011 Ovsjanikov et al. ........... 707/780
2012/0016678 A1* 1/2012 Gruber et al. ................. 704/275

OTHER PUBLICATIONS

Mehta, Raj, and Eugene Sivadas. "Direct marketing on the Internet: An empirical assessment of consumer attitudes." Journal of Direct Marketing 9.3 (1995): 21-32.*

Chaochang Chiu, A case-based customer classification approach for direct marketing, Expert Systems with Applications, vol. 22, Issue 2, Feb. 2002, pp. 163-168, ISSN 0957-4174.*

Jedid-Jah Jonker, Nanda Piersma, Dirk Van den Poel, Joint optimization of customer segmentation and marketing policy to maximize long-term profitability, Expert Systems with Applications, vol. 27, Issue 2, Aug. 2004, pp. 159-168, ISSN 0957-4174.*

Sung Ho Ha, Sung Min Bae, Sang Chan Park, Customer's time-variant purchase behavior and corresponding marketing strategies: an online retailer's case, Computers & Industrial Engineering, vol. 43, Issue 4, Sep. 2002, pp. 801-820.*

Anita Prinzie, Dirk Van den Poel, Constrained optimization of data-mining problems to improve model performance: A direct-marketing application, Expert Systems with Applications, vol. 29, Issue 3, Oct. 2005, pp. 630-640.*

Young Ae Kim, Hee Seok Song, Soung Hie Kim, A new marketing strategy map for direct marketing, Knowledge-Based Systems, vol. 22, Issue 5, Jul. 2009, pp. 327-335.*

Frederick Kaefer, Carrie M. Heilman, Samuel D. Ramenofsky, A neural network application to consumer classification to improve the timing of direct marketing activities, Computers & Operations Research, vol. 32, Issue 10, Oct. 2005, pp. 2595-2615.*

* cited by examiner

Assume ⟶ infer the attribute "Organic" (find products that are "Organic")
— In this case "Organic" is an attribute that is marked in the categorization
— 62 "Organic" products that are bought in two months
(Number of "Organic" products at the top as a function of number of examples)

| Top N | N. Examples = 1 | N. Examples = 3 | N. Examples = 5 | N. Examples = 10 |
|---|---|---|---|---|
| 5 | 5 | 5 | 5 | 5 |
| 10 | 9 | 10 | 10 | 10 |
| 25 | 12 | 22 | 23 | 25 |
| 50 | 12 | 34 | 40 | 40 |
| 100 | 12 | 56 | 53 | 52 |

Fig. 3

Assume → infer relative price
— Use "loyalty program savers" as proxy
— 106 "loyalty program products" bought are in two months
Number of "loyalty program products" at the top as a function of number of examples

| Top N | N. Examples = 1 | N. Examples = 3 | N. Examples = 5 | N. Examples = 10 |
|---|---|---|---|---|
| 5 | 3 | 4 | 5 | 5 |
| 10 | 6 | 9 | 9 | 9 |
| 25 | 8 | 20 | 22 | 21 |
| 50 | 12 | 43 | 42 | 39 |
| 100 | 17 | 74 | 75 | 74 |

Fig. 4

SYSTEM AND METHOD FOR EXAMPLE BASED TARGETED MARKETING

BACKGROUND

Retailers want to send out marketing operations specifically targeted to the appropriate customers. Such an approach has many advantages, including but not limited to saving on marketing costs and building relationships with valued customers by showing that the retailer understands their needs. For each marketing operation, a retailer may have a specific concept in mind. For optimal results, the marketing operation should accurately target customers with relevant advertising typifying the concept in order to maximize the benefits for all involved. In this regard, a retailer might use demographic information or the like to decide on some segments to send a marketing message. Such conventional efforts, however, have some significant limitations.

BRIEF SUMMARY

Embodiments of the invention permit users such as retailers to utilize customer and/or product data to appropriately convert marketing concepts into targeted advertising operations. Embodiments of the invention provide an interface to a retailer to define target customers by picking examples that typify the kind of customers the retailer wants to target with a concept-based marketing operation. From such examples, embodiments of the invention expand through concept learning to a set of examples that exemplify the underlying marketing concept.

Embodiments of the invention use various sources of data to learn the marketing concept. Embodiments of the invention find products that are close to example products input by the retailer and moreover permit flexibility at different stages of the process, allowing the retailer to refine the marketing concept by correcting the list of examples. Embodiments of the invention map outputs, such as a customer list, to the marketing concept as represented by the examples. Embodiments of the invention also find customer segments to analyze the specific type(s) of product attributes that attract them, which can be important for a retailer to gain insights for future marketing operations.

In summary, one aspect of the invention provides an apparatus comprising: one or more processors; and a computer readable storage medium having computer readable program code embodied therewith and executable by the one or more processors, the computer readable program code comprising: computer readable program code configured to provide a user interface for inputting one or more example inputs representing a marketing concept; computer readable program code configured to provide an expanded list of examples representing the marketing concept based on the one or more example inputs; and computer readable program code configured to provide one or more output lists based on the expanded list of examples.

Another aspect of the invention provides a method comprising: using one or more processors to execute computer readable program code embodied on a computer readable storage medium, the computer readable program code comprising: computer readable program code configured to provide a user interface for inputting one or more example inputs representing a marketing concept; computer readable program code configured to provide an expanded list of examples representing the marketing concept based on the one or more example inputs; and computer readable program code configured to provide one or more output lists based on the expanded list of examples.

A further aspect of the invention provides a computer program product comprising: a computer readable storage medium having computer readable program code embodied therewith, the computer readable program code comprising: computer readable program code configured to provide a user interface for inputting one or more example inputs representing a marketing concept; computer readable program code configured to provide an expanded list of examples representing the marketing concept based on the one or more example inputs; and computer readable program code configured to provide one or more output lists based on the expanded list of examples.

A still further aspect of the invention provides a system comprising: one or more processors; a display device; and a computer readable storage medium having computer readable program code embodied therewith and executable by the one or more processors, the computer readable program code comprising: computer readable program code configured to provide a user interface for inputting one or more of product example inputs and customer example inputs representing a marketing concept for a targeted marketing operations; computer readable program code configured to utilize the one or more of product example inputs and customer example inputs representing a marketing concept for a targeted marketing operation as seed inputs for a machine learning program configured to provide an expanded list of examples representing the marketing concept, the expanded list of examples derived from one or more of a transaction data source, a product attribute data source, and a customer demographic data source; and computer readable program code configured to provide automatically to the display device one or more output lists according to a predetermined threshold corresponding to examples in the expanded list of examples.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the Figures herein, may be arranged and designed in a wide variety of different configurations in addition to the described exemplary embodiments. Thus, the following more detailed description of the embodiments of the invention, as represented in the Figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, etc. In other instances, well-known structures, materials, or operations are not shown or described in detail to avoid obscuring aspects of the invention.

Various embodiments of the invention provide an interface to a retailer to define target customers fitting a marketing concept by picking example products that typify the marketing concept and thus the kind of customers the retailer wants to target. For example, a retailer may pick only positive example products typifying the marketing concept or pick both positive and negative products typifying a marketing concept. In the non-limiting and exemplary use case of a "health food" operation, a retailer may select positive example products representing his or her conception of "health food", such as fruits and vegetables. Moreover, the retailer may choose to provide negative example products such as rich foods, high in fat or overall calorie content.

From such example products, embodiments of the invention expand to a set of products that exemplify the underlying marketing concept. Embodiments of the invention do not simply look for customers who purchased the exemplary products (or conversely look for customers that did not purchase the negative exemplary products), as this list would be too small, among other difficulties. Thus, embodiments of the invention use various sources of data to find products that are "close" (in a positive or negative way, depending on the examples provided) to the example products. The various sources of data for example include but are not limited to transaction data (which customers bought which products and the like), product data (product categorization via various attributes that the retailer/manufacturer, et cetera provide), and/or customer data (for example, demographic information about the customers).

Embodiments of the invention moreover permit flexibility at different stages of the process, allowing the retailer to refine the marketing concept by correcting the list of example products. Thus, embodiments of the invention allow the retailer to maintain control over the marketing concept learning process throughout its development. Embodiments of the invention also permit retailers to find customer segments to analyze the specific type(s) of product attributes that attract them, which can be important for a retailer to gain insights for future marketing operations.

In and among other advantages provided by various embodiments of the invention are minimizing the effort (on the part of the retailer) needed to create an effective target list of customers by using just a few examples as inputs. Embodiments of the invention can thus be characterized as an effective way to combine human intelligence and intuition with data mining application(s). Moreover, embodiments of the invention work from what customers are actually buying rather than statistical relations between demographics and what customers might be interested in buying. Thus, embodiments of the invention work even for new product lines and/or concepts that have not yet had sufficient time to establish the historical data on which conventional solutions rely. In fact, embodiments of the invention work to provide targeted marketing customer lists even without any customer demographic data and/or product attribute data.

Consistent with embodiments of the invention, there are various classes of processes that can allow for expansion the list of products/customers given a few examples. Collaborative filtering, random walks on graphs, and pattern classification are methods for taking a few examples and generalizing beyond these few labeled examples. Thus, embodiments of the invention provide an application of collaborative filtering/random graph/pattern classification (one class classification or binary classification) walks et cetera to expand on a seed list of items to arrive at a class of customers for targeted marketing. Embodiments of the invention provide a novel user interface that requires as input only a few example items and produces many relevant customers that can be targeted with advertising.

The illustrated embodiments of the invention will be best understood by reference to the Figures. The following description is intended only by way of example and simply illustrates certain selected exemplary embodiments of the invention as claimed herein.

The flowchart and block diagrams in the Figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
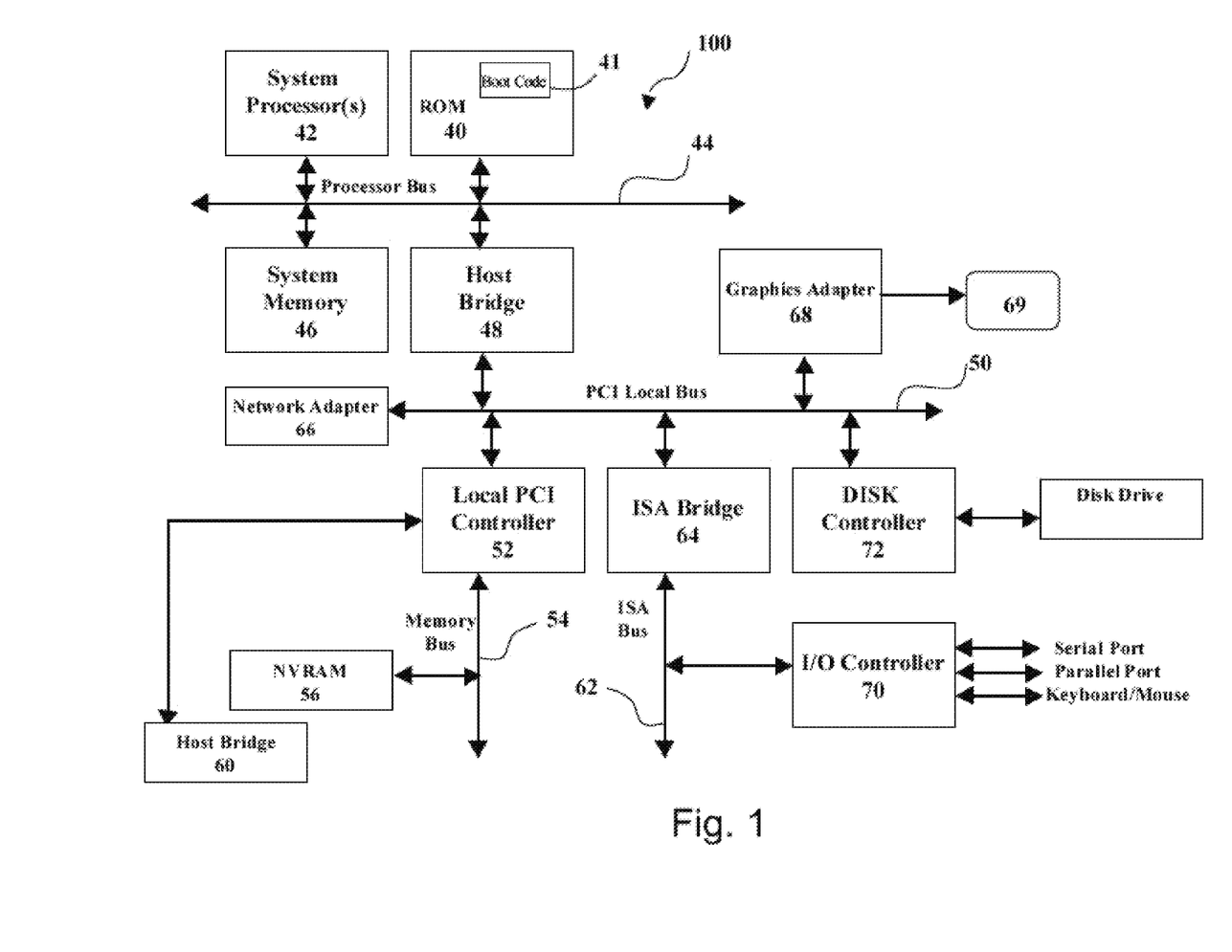
FIG. 1 illustrates a computer system according to an embodiment of the invention.

Referring now to FIG. 1, there is depicted a block diagram of an illustrative embodiment of a computer system 100. The illustrative embodiment depicted in FIG. 1 may be an electronic device such as a desktop computer, workstation computer, laptop computer, mobile computing device, smart phone and the like. As is apparent from the description, however, the embodiments of the invention may be implemented in any appropriately configured device, as described herein.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a as a keyboard, mouse, serial and parallel ports, et cetera. A disk controller 72 connects a disk drive with PCI local bus 50. The USB Bus and USB Controller (not shown) are part of the Local PCI controller (52).

Figure 2:
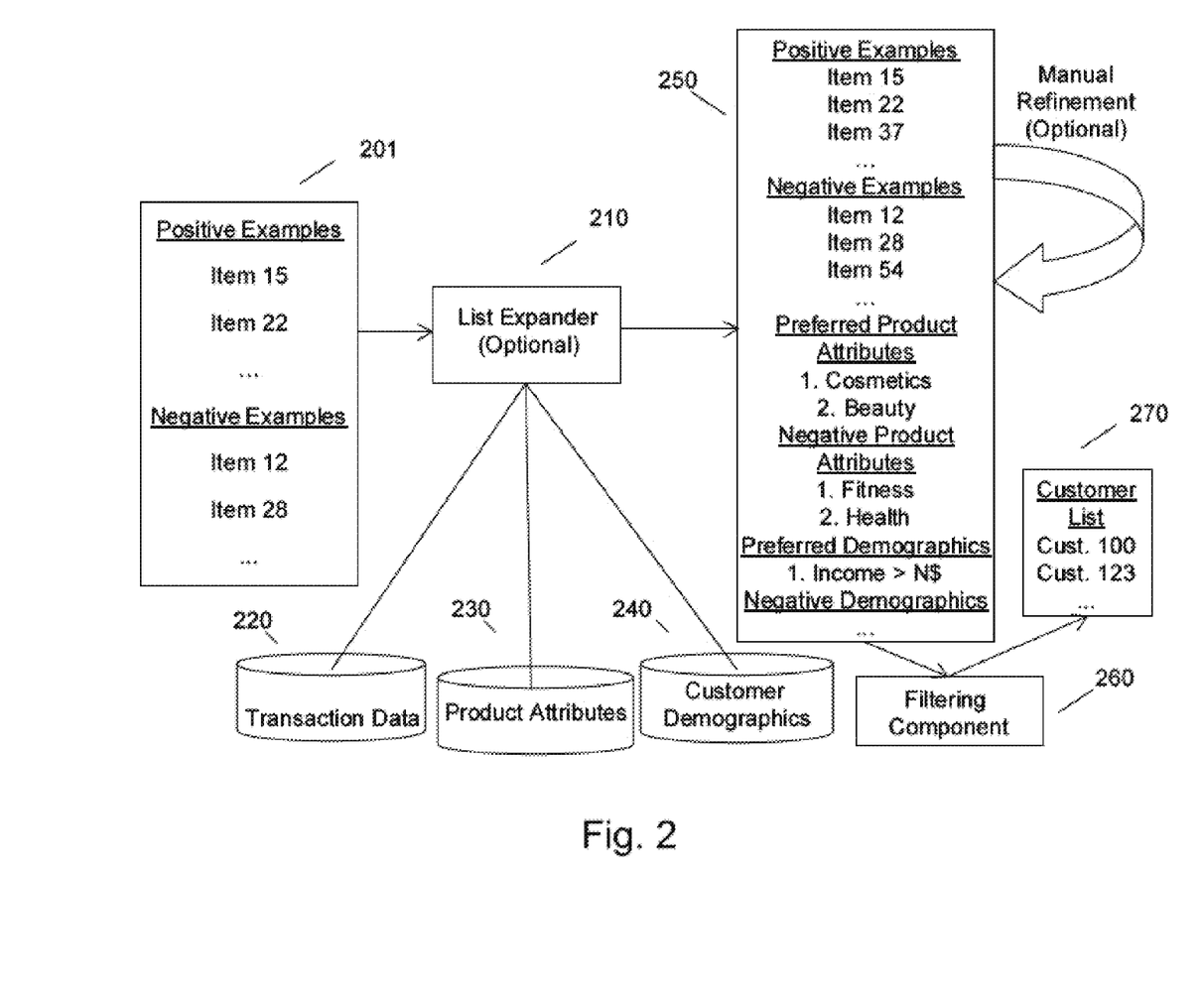
FIG. 2 illustrates a targeted marketing system according to an embodiment of the invention.

FIG. 2 illustrates a targeted advertising system according to an exemplary embodiment of the invention. As shown, a user interface 201 is provided to the retailer to define the marketing concept (and thus use the system to select the target customers) by picking example products that typify the marketing concept the retailer has in mind. These example products can consist of only positive examples (Item 15, Item 22) or both positive examples and negative examples (Item 12, Item 28). Moreover, customers may be marked as positive or negative examples (not shown); thus it should be understood that they system can utilize as input product examples, customer examples, or a combination of both. Embodiments of the invention then "learn" the concept based on the examples using a list expander 210 having access to sources of information including but not limited to transaction data 220, product attributes 230 and/or customer demographics 240.

The following is illustrative of an exemplary way a system according to an embodiment of the invention "learns" a marketing concept from the examples input by a retailer. Assume there are positive and negative examples input at user interface 201. The following expression can be used by embodiments of the invention to expand on the examples input and produce targeted customer output:

$$\min \lambda_1 \sum_{c,p} w_{cp}(s_c - s_p)^2 + \lambda_2 \sum_{pp'} w_{pp'}(s_p - s_{p'})^2 + \lambda_3 \sum_{cc'} w_{cc'}(s_c - s_{c'})^2$$

Here, $w_{cp}$ is a similarity score relating customer c and product p. One choice is $w_{cp}=1$ if c bought p, 0 otherwise. Another choice is the amount the customer c spent on product p. $w_{pp}$ is a similarity score relating products p and p'. This similarity is calculated based on product attributes. An example choice is $w_{pp}$' is 2 if they belong to the same subcategory, 1 if they belong to the same category but not same subcategory and 0 otherwise. $w_{cc}$' is a similarity score relating two customer c and c'. This is calculated based on customer's attributes. An example choice is: $w_{cc}$' is 2 if they are in the same age group and income group, 1 if they are in the same age group or income group but not both, 0 otherwise. $\lambda_1$, $\lambda_2$, $\lambda_3$ (lambda__1, lambda__2 and lambda__3) are set to control the relative weights of the three terms. One method to set them is to initially set them to all to be 1, and adjust these weights based on the feedback from the interactive learning mechanism. $S_c$, $S_p$ represent the scores for customer's and products respectively, some of which are fixed to +1 or −1 based on the examples provided. $S_c=+1$ indicates that the customer c is a positive example of the concept being learned.

Solving the optimization problem for the scores $S_c$ and $S_p$ can be done in one of several ways according to embodiments of the invention. Basically the structure of the problem is well understood and various methods can be used to solve for the scores $S_c$ and $S_p$. Given the structure of the problem, it is guaranteed to have a unique optimal solution, for example via convex (quadratic) optimization with unique optimum, solved with matrix inversion, or use iterative updates (will converge). Such an approach is efficient due to sparsity/structure of w's. Those having ordinary skill in the relevant art will recognize that various other techniques for machine-implemented concept "learning" based on examples are possible. It is also possible to employ active learning for example selection. Preferably, the retailer selects examples with a lot of neighbors (products/customers that are close to other product/customers based on the similarity weights $w_{cc}$' and $w_{pp}$'. So to say a product p has lot of neighbors is equivalent to saying there are many other products that this product is similar to ($w_{pp}$' is high)). Accordingly, (1) the optimization problem given in the above equation is well behaved and (2) the process of learning the concept is sped up by active learning.

Thus, an embodiment of the invention uses the above expression to assign a score to each product and customer to indicate relative fit to the marketing concept. Thus, a product corresponding closely with the overall concept is given a high score relative to a product not typifying the marketing concept. Consequently, customers that have previously demonstrated an affinity for the high-scoring products (for example, customers that have previously purchased the products) will similarly be assigned a relatively high score compared to other customers.

One or more lists 250 of the most positive and most negative products (according to a predetermined threshold value) are presented to the retailer. The retailer is enabled to refine the scores manually, though this is not necessary, but again gives the retailer's intuition the ability to drive the concept learning. For example, the retailer can give some feedback about the inferred scores/list. For example, a retailer can force the concept learning in a particular direction by marking some particularly "close" products with scores at or near +1. As another example, a retailer can exclude some products (or some attribute representing a set of products) from being included in the concept. As another example, a retailer can search for and include all products with a certain attribute/word in a catalogue description and mark at +1.

In a similar way, embodiments of the invention allow the retailer to refine the list of example customers (where positive and negative demographic information may take the place of product attributes). For example, using an embodiment of the invention, a clothes retailer may utilize demographic data to force the concept learning in a particular way. Assuming the clothes retailer wishes to identify target customers interested in a trendy new product typically considered desirable by youngsters, the clothes retailer may use customer age as positive and negative example input into a system according to an embodiment of the invention. Moreover, the clothes retailer may input a particular positive (or negative) example customer(s) typifying (or not typifying) the concept of the retailer has in mind for the marketing.

Thus, embodiments of the invention use an active learning framework to present the most informative products to the retailer for feedback. The retailer may accept the initial output or provide feedback and repeat the learning process to refine the results. Once an appropriate expanded list of products representing the marketing concept has been formed (again optionally edited by the retailer using the active learning framework), the retailer can now use the system to choose target customers. The target customers can include customers with scores above a threshold, or top k customers, et cetera, which will be used by the filtering component 260 to automatically output the final customer list 270 for display to the retailer.

As a non-limiting example consistent with embodiments of the invention, consider a retailer that wants to market a new product that has not previously been sold, for example an environmentally conscious detergent. Assume that the retailer does not have any previous customer data on this product, since it is new. Assume further that there are no directly related products, i.e. there are no other brands of environmentally conscious detergent being offered by this retailer.

Embodiments of the invention can nonetheless be utilized to learn the new concept of environmentally conscious detergent to market such a product using existing customer and product data. In this case, the retailer can choose some other products that, based on the retailer's conception and intuition, typify the concept of environmentally conscious detergent. For example, the retailer may select as example products a detergent and an environmentally safe household cleaner. From these seed (example) products, embodiments of will generate an expanded list of products using for example the scoring mechanism discussed herein. The retailer can review the list and edit it as necessary, repeating the scoring until the (final) expanded list seems accurate, that is represents products that the retailer thinks represent the environmentally conscious detergent concept. Thereafter, the retailer can review an automatically generated list of customers whose scores match tightly with the list of products typifying the concept.

Figure 3:
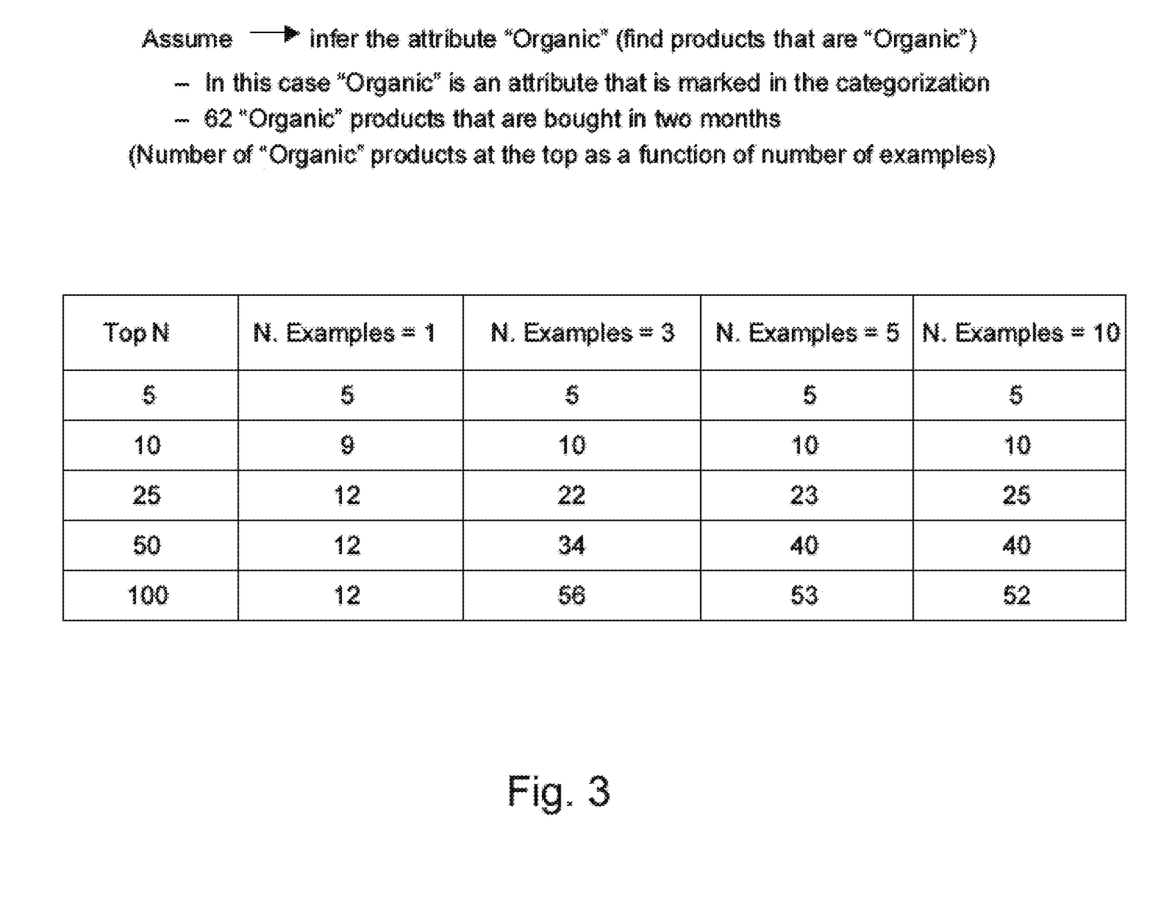
FIG. 3 illustrates an exemplary use case of a targeted marketing system according to an embodiment of the invention.
Figure 4:
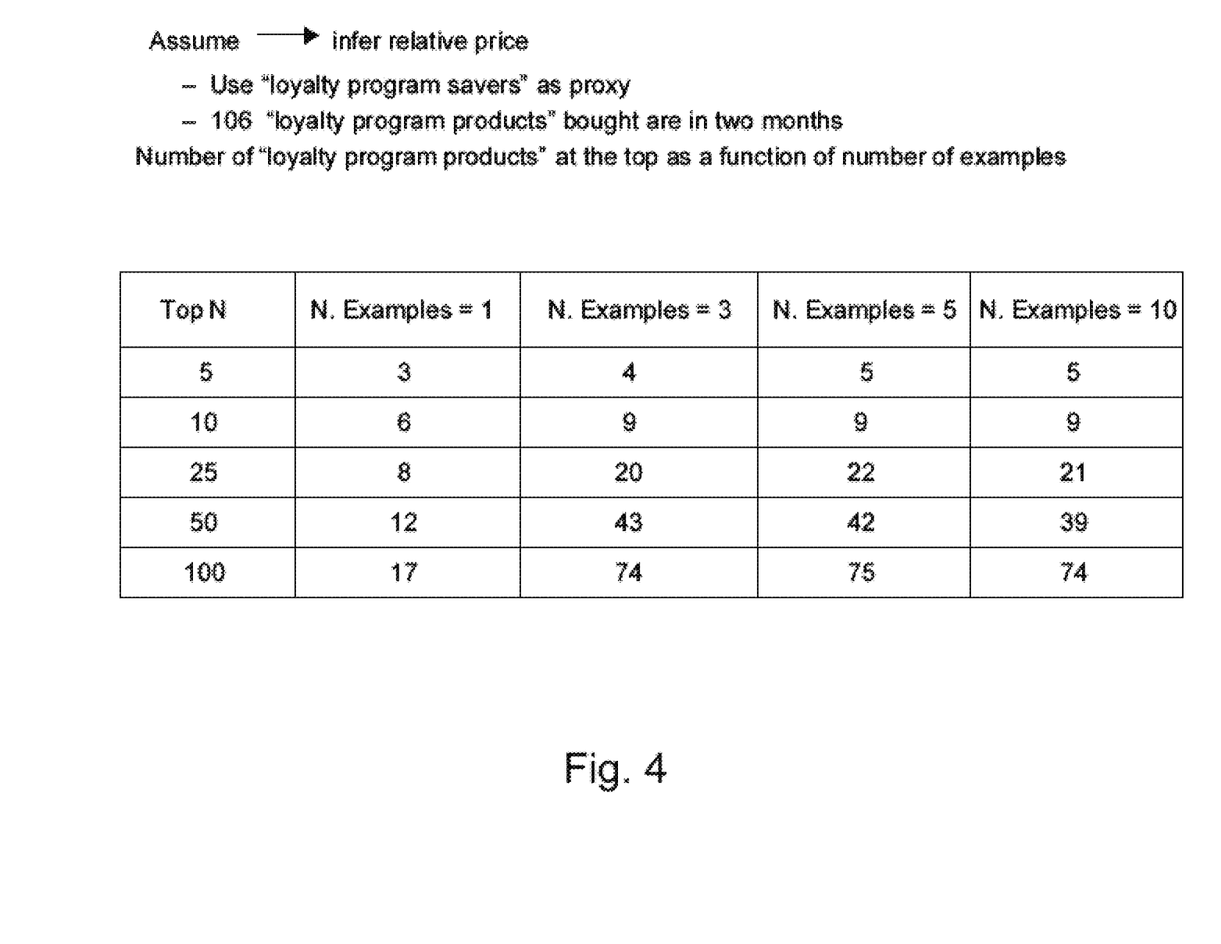
FIG. 4 illustrates an exemplary use case of a targeted marketing system according to an embodiment of the invention.

Turning to FIG. 3 and FIG. 4, exemplary use cases of a concept based targeted marketing system according to embodiments of the invention are illustrated. These exemplary use cases are based on approximately two months of transaction data. Each transaction was tagged with a customer identifier. Roughly 30,000 customers made transactions during this period, with roughly 30,000 SKUs (stock keeping units) purchased out of a total of 100,000 in the catalogue. There were roughly 75,000 transactions and 1.1 million items purchased. Notably, these use cases were produced without any customer data (that is, customer demographic data). The concepts were produced on product information (catalogue taxonomy and product descriptions (words)).

Referring to FIG. 3, the list of "organic" products was known ("organic" is an attribute that is marked in the categorization in the product description). Various customers bought sixty-two (62) "organic" products in the two-month period. Thus, the data in the table is a representation of the quality of the learning algorithm for identifying "organic" products from this list. A few examples of products were selected as seed data (here, 1, 3, 5 and 10 positive examples were selected) to provide as input to the list generator 210. FIG. 3 illustrates in tabular form the results of list generator 210. The columns list the number of the examples given whereas the rows indicate the number of "organic" products returned (out of the top N products looked at). Thus, for 1 input example, 12 of the top 100 products returned were actually "organic" and could be used to define a customer set for marketing "organic". Similarly, where 10 examples where given, 40 of the top 50 returned were "organic" products.

Turning to FIG. 4, an exemplary "budget conscious" concept is tested according to an embodiment of the invention. Here, loyalty program customers were used as a proxy for representing examples of customers wishing to maximize savings. This proxy was used (via a learning algorithm) to determine budget type products. Thus, for 3 input examples of such loyalty program customers, a total of 74 out of 100 products returned were identified as loyalty program type products. These results can be used to correlate a list of customers with the expanded list.

In brief recapitulation, embodiments of the invention provide retailers with the ability to employ concept-based marketing using only a few representative examples. The embodiments of the invention take these seed examples, provide an expanded list (that can be edited by the retailer as desired) representative of the concept, and map the example list to the final set of customers to be included in a targeted marketing operation.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. An apparatus comprising:
one or more processors; and
a computer readable storage medium having computer readable program code embodied therewith and executable by the one or more processors, the computer readable program code comprising:
computer readable program code configured to utilize the one or more processors to permit, at a user interface, inputting of one or more example inputs representing a marketing concept, the example inputs including at least one positive example and at least one negative example;
computer readable program code configured to utilize the one or more processors to present at the user interface an expanded list of examples representing the marketing concept based on the one or more example inputs; and
computer readable program code configured to utilize the one or more processors to output one or more output lists for display at the user interface, based on the expanded list of examples, the one or more output lists comprising a filtered target customer list;
the one or more example inputs representing a marketing concept comprising one or more of: at least one product example and at least one customer example;
the at least one positive example comprising at least one example which guides inclusion in the filtered target customer list;
the at least one negative example comprising at least one example which guides exclusion from the filtered output target customer list; and
said computer readable program code being configured to utilize the one or more processors to incorporate at least one similarity score in outputting the one or more output lists, the at least one similarity score comprising at least one of: a similarity score relating two products; and a similarity score relating two customers.

2. The apparatus according to claim 1, wherein the one or more example inputs comprise one or more product identifications.

3. The apparatus according to claim 1, wherein the one or more example inputs comprise one or more customer identifications.

4. The apparatus according to claim 1, wherein the computer readable program code configured to utilize the one or more processors to present at the user interface an expanded list of examples representing the marketing concept based on the one or more example inputs is further configured to utilize one or more of transaction data, product attribute data and customer demographic data to provide the expanded list.

5. The apparatus according to claim 1, wherein the computer readable program code further comprises computer readable program code configured to utilize the one or more processors to permit, at the user interface, editing of the expanded list.

6. The apparatus according to claim 5, wherein:
the computer readable program code configured to utilize the one or more processors to permit, at the user interface, editing of the expanded list is configured to permit the user to provide one or more of product attribute information and customer demographic information to update the expanded list; and
the computer readable program code configured to utilize the one or more processors to present at the user interface an expanded list of examples representing the marketing concept based on the one or more example inputs is configured to calculate an updated expanded list using the one or more of product attribute information and customer demographic information.

7. A method comprising:
using one or more processors to execute computer readable program code embodied on a computer readable storage medium, the computer readable program code comprising:
computer readable program code configured to utilize the one or more processors to permit, at a user interface, inputting of one or more example inputs representing a marketing concept, the example inputs including at least one positive example and at least one negative example;
computer readable program code configured to utilize the one or more processors to present at the user interface an expanded list of examples representing the marketing concept based on the one or more example inputs; and
computer readable program code configured to utilize the one or more processors to output one or more output lists for display at the user interface, based on the expanded list of examples, the one or more output lists comprising a filtered target customer list;
the one or more example inputs representing a marketing concept comprising one or more of: at least one product example and at least one customer example;
the at least one positive example comprising at least one example which guides inclusion in the filtered target customer list;
the at least one negative example comprising at least one example which guides exclusion from the filtered output target customer list; and
said computer readable program code being configured to utilize the one or more processors to incorporate at least one similarity score in outputting the one or more output lists, the at least one similarity score comprising at least one of: a similarity score relating two products; and a similarity score relating two customers.

8. The method according to claim 7, wherein the one or more example inputs comprise one or more product identifications.

9. The method according to claim 7, wherein the one or more example inputs comprise one or more customer identifications.

10. The method according to claim 7, wherein the computer readable program code configured to utilize the one or more processors to present at the user interface an expanded list of examples representing the marketing concept based on the one or more example inputs is further configured to utilize one or more of transaction data, product attribute data and customer demographic data to provide the expanded list.

11. The method according to claim 7, wherein the computer readable program code further comprises computer readable program code configured to utilize the one or more processors to permit, at the user interface, editing of the expanded list.

12. The method according to claim 11, wherein:
the computer readable program code configured to utilize the one or more processors to permit, at the user interface, editing of the expanded list is configured to permit the user to provide one or more of product attribute information and customer demographic information to update the expanded list; and
the computer readable program code configured to utilize the one or more processors to present at the user interface an expanded list of examples representing the marketing concept based on the one or more example inputs is configured to calculate an updated expanded list using the one or more of product attribute information and customer demographic information.

13. The method according to claim 7, wherein the one or more example inputs representing a marketing concept comprise positive and negative product examples.

14. The method according to claim 7, wherein the one or more example inputs representing a marketing concept comprise positive and negative customer examples.

15. A computer program product comprising:
a computer readable storage medium having computer readable program code embodied therewith, the computer readable program code comprising:
computer readable program code configured to utilize one or more processors to permit, at a user interface, inputting of one or more example inputs representing a marketing concept, the example inputs including at least one positive example and at least one negative example;
computer readable program code configured to utilize one or more processors to present at the user interface an expanded list of examples representing the marketing concept based on the one or more example inputs; and
computer readable program code configured to utilize one or more processors to output one or more output lists for display at the user interface, based on the expanded list of examples, the one or more output lists comprising a filtered target customer list;
the one or more example inputs representing a marketing concept comprising one or more of: at least one product example and at least one customer example;
the at least one positive example comprising at least one example which guides inclusion in the filtered target customer list;
the at least one negative example comprising at least one example which guides exclusion from the filtered output target customer list; and
said computer readable program code being configured to utilize one or more processors to incorporate at least one similarity score in outputting the one or more output lists, the at least one similarity score comprising at least one of: a similarity score relating two products; and a similarity score relating two customers.

16. The computer program product according to claim 15, wherein the one or more example inputs comprise one or more product identifications.

17. The computer program product according to claim 16, wherein the one or more example inputs comprise one or more customer identifications.

18. The computer program product according to claim 16, wherein the computer readable program code configured to utilize one or more processors to present at the user interface an expanded list of examples representing the marketing concept based on the one or more example inputs is further configured to utilize one or more of transaction data, product attribute data and customer demographic data to provide the expanded list.

19. A system comprising:
one or more processors;
a display device; and
a computer readable storage medium having computer readable program code embodied therewith and executable by the one or more processors, the computer readable program code comprising:
computer readable program code configured to utilize the one or more processors to permit, at a user interface at the display device, inputting of one or more of product example inputs and customer example inputs representing a marketing concept for a targeted marketing operation, the one or more of product example inputs and customer example inputs including at least one positive example and at least one negative example;

computer readable program code configured to utilize the one or more of product example inputs and customer example inputs representing a marketing concept for a targeted marketing operation as seed inputs for a machine learning program configured to utilize the one or more processors to present at the user interface at the display device an expanded list of examples representing the marketing concept, the expanded list of examples derived from one or more of a transaction data source, a product attribute data source, and a customer demographic data source; and computer readable program code configured to utilize the one or more processors to output automatically to the user interface at the display device one or more output lists according to a predetermined threshold corresponding to examples in the expanded list of examples, the one or more output lists comprising a filtered target customer list;

the one or more example inputs representing a marketing concept comprising one or more of: at least one product example and at least one customer example;

the at least one positive example comprising at least one example which guides inclusion in the filtered target customer list;

the at least one negative example comprising at least one example which guides exclusion from the filtered output target customer list; and said computer readable program code being configured to utilize the one or more processors to incorporate at least one similarity score in outputting the one or more output lists, the at least one similarity score comprising at least one of: a similarity score relating two products; and a similarity score relating two customers.

* * * * *